Sept. 23, 1924.
H. SAUNIER
VALVE CHAMBER FOR GAS MASKS
Filed Aug. 23, 1921
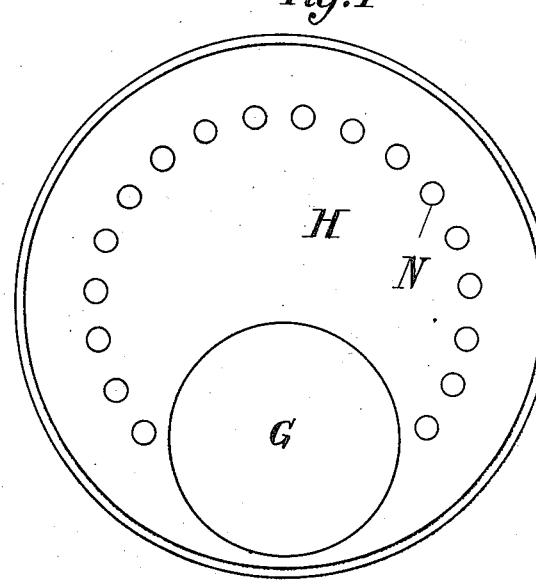
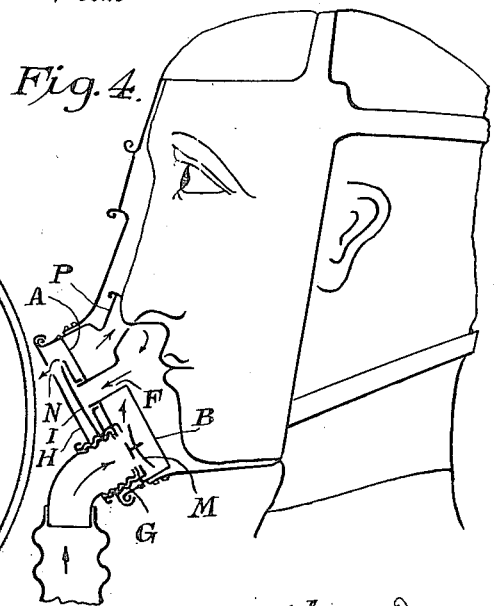
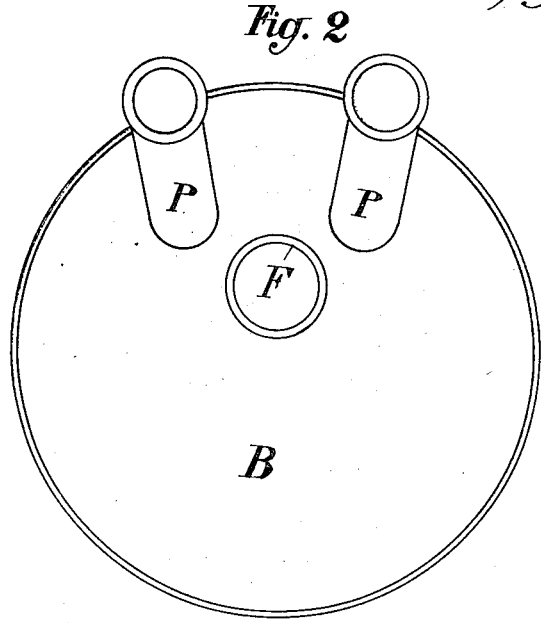
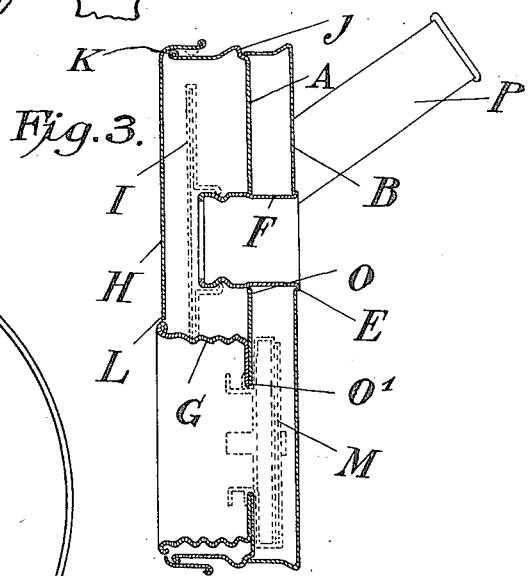
Inventor.
Hippolyte Saunier,
By Henry Orth Jr., Atty.

Patented Sept. 23, 1924.

1,509,319

UNITED STATES PATENT OFFICE.

HIPPOLYTE SAUNIER, OF PARIS, FRANCE.

VALVE CHAMBER FOR GAS MASKS.

Application filed August 23, 1921. Serial No. 494,579.

(GRANTED UNDER THE PROVISIONS OF THE ACT OF MARCH 3, 1921, 41 STAT. L., 1313.)

*To all whom it may concern:*

Be it known that I, HIPPOLYTE SAUNIER, a citizen of the Republic of France, residing in Paris, France, have invented certain new and useful Improvements in Valve Chambers for Gas Masks (for which I have filed an application for patent in France dated July 27, 1918, Patent No. 515,598); and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a valve unit of special character providing in an automatic manner for the admission and discharge of fluids, either liquids or gases, through two separate orifices for suction and exhaust, under the action of alternate pressure and expansion movements taking place within any suitable closed receptacle on the exterior of which the said device is mounted by a fluid-tight joint and is especially applicable to masks for breathing apparatus, anaesthesia apparatus and the like.

In an accessory manner, it may be employed by the aid of one or more suitably disposed tubes—differently situated according to circumstances—to cause the air, gas or liquid drawn in to be delivered to one or more points of the internal surface of any suitable chamber whereon the said device may be mounted, and as a particular feature it is adapted to afford transparency as regards vision through sight holes or the like which are liable to become clouded.

The invention consists of a valve unit for breathing apparatus or gas masks in which there are two superposed shells, one of the shells having an inlet member, an outlet member passing through both shells and a valve for each member and preferably constructed of sheet metal forming a readily made construction. The invention also includes means to direct incoming air across the sight openings to prevent the glasses therein from becoming clouded.

The following description, together with the accompanying drawings which are given by way of example, sets forth a practical embodiment of my invention.

Fig. 1 is a front view of the apparatus.

Fig. 2 is a rear view of the same, Fig. 3 a section on a vertical central plane and Fig. 4 is a diagram showing the use of the device on a mask.

A indicates a stamped piece having the shape of a basin or shell, whose outer profile comprises the shoulder J and the overturned edge K. The bottom portion has formed therein the two apertures O, O¹ in diametral situation. Upon the shoulder J of the said shell A is fitted a second shell B whose bottom portion has formed therein the aperture E which is so disposed that when the member B is fitted upon the member A, the said aperture shall be situated upon the axis of the aperture O of the shell A. Through the two apertures O, E is inserted the discharge tube F which is soldered at both the said apertures.

A coupling or inlet member G which is either screwthreaded or is provided with a bayonet joint, is soldered to the bottom of the shell A and is concentric with the aperture O¹. The bottom of the said coupling member has formed therein an aperture at the center corresponding to the aperture O¹ upon which it is superposed. The said coupling member constitutes a fluid-tight connection between the valve chamber and any suitable apparatus such as a filter, mixing device, or the like, by means of a tube whose end portion is coupled to the screw-threaded part or to the bayonet socket. Upon the end of the connecting tube F is disposed a delivery valve I which comprises for instance two rubber disks cemented together at certain points around the edges, one of the said disks having an aperture therein for assembling purposes. The said valve may obviously be replaced by a like valve device adapted to open in the same sense. In the rear of the aperture O¹ of the member A is disposed the suction valve M which may be constituted as in the preceding case. These two valves are shown by dotted lines.

The whole device is protected by the cover H which is disposed upon the main body by any suitable pressure closing means. The said cover is provided with a large aperture L wherein is disposed the edge of the said coupling member, as well as a plurality of smaller apertures N which are circularly disposed and serve for the discharge of the air which is delivered by the valve I. The tubes employed for the material which is subject to the suction effect are caused to start from the shell B and communicate with the interior thereof. In the constructural form herein represented, the said tubes are disposed at P in an oblique position upon the bottom of the said shell and symmetrical with reference to a diameter passing through the center of the tube F, being situated somewhat above the said tube. These tubes direct purified air, or air mixed with oxygen, past the line of sight between the eyes and the glazed sight openings, preventing the glasses from becoming clouded by moisture.

This apparatus will afford excellent conditions for the flow of the required products as well as an absolute separation between the admission and the discharge. It is obvious that the various details of the said apparatus may be modified in any suitable manner without departing from the spirit of this invention.

I claim—

1. A valve unit for breathing apparatus, comprising two dish-like shells one covering the other, an inlet member secured to one shell and having a valve, an outlet tube passing through both shells and terminating in a valve and a cover closing one of the shells and through which said inlet member passes, said cover having perforations for the escape of exhalation.

2. A valve unit for breathing apparatus, comprising two dished shells, the bottom of one shell closing the other shell and a perforated cover for the end of the shell that is open, thereby forming an inlet chamber between the two shells and an outlet chamber between the cover and one of the shells, a valved inlet pipe connection for the inlet chamber and a valved outlet tube passing through the walls of both chambers and discharging into the outlet chamber, and tubes extending from the inlet chamber for directing incoming gas across the line of vision of the user.

In testimony that I claim the foregoing as my invention, I have signed my name.

HIPPOLYTE SAUNIER.